United States Patent [19]

Suzuki et al.

[11] 3,950,451

[45] Apr. 13, 1976

[54] HARDENABLE EPOXY RESIN COMPOSITION

[75] Inventors: Hirosi Suzuki; Akira Matsui; Tsunekazu Inoue, all of Tokyo, Japan

[73] Assignee: Asahi Denka Kogyo K.K., Tokyo, Japan

[22] Filed: Dec. 27, 1973

[21] Appl. No.: 428,674

Related U.S. Application Data

[63] Continuation of Ser. No. 228,729, Feb. 23, 1972, abandoned.

[30] Foreign Application Priority Data

Feb. 27, 1971   Japan.................................. 46-10077

[52] U.S. Cl.............. 260/831; 260/47 EN; 428/416
[51] Int. Cl.²................... C08G 59/18; C08L 63/00
[58] Field of Search ........................ 260/831, 47 EN

[56] References Cited
UNITED STATES PATENTS

| | | | |
|---|---|---|---|
| 3,519,576 | 7/1970 | Johnson........................... | 260/47 EN |
| 3,658,728 | 4/1972 | Hoffmann et al. ............. | 260/47 EN |

FOREIGN PATENTS OR APPLICATIONS

| | | | |
|---|---|---|---|
| 868,892 | 5/1961 | United Kingdom ............ | 260/47 EN |
| 886,767 | 1/1962 | United Kingdom................. | 260/831 |
| 1,163,502 | 9/1969 | United Kingdom ............ | 260/47 EN |
| 1,322,661 | 2/1963 | France............................ | 260/47 EN |

*Primary Examiner*—John C. Bleutge
*Attorney, Agent, or Firm*—Woodhams, Blanchard and Flynn

[57] ABSTRACT

A hardenable epoxy resin composition hardenable at a temperature from about 0° to 5°C. is made by mixing (A) one or more epoxy compound (I) containing on the average more than one adjacent epoxy group per molecule with (B) one or more reaction product (II) produced by reacting (1) a reaction product (II-1) produced by reacting essentially (1—1) a phenol (a) having at least one reactive hydrogen atom attached to aromatic nucleus and (1-2) a polyamine (b) having one or more active hydrogen atoms attached to amino nitrogen atom per molecule and (1-3) a member selected from the group comprising carbonyl compounds having one or more carbonyl groups per molecule and its reactive derivatives (c) in the mole ratio of a phenol (a); a polyamine (b): a member selected from the group comprising a carbonyl compounds and its reactive derivatives (c) being 1: at least 1: at least 1 (mole:mole:mole), and (2) a phenol (d) in the ratio of equivalence of phenolic hydroxy group of a phenol (d): equivalence of active hydrogen atom attached to amino nitrogen atom of the reaction product (II-1) being 0.1 – 1.0 : 1.

1 Claim, No Drawings

HARDENABLE EPOXY RESIN COMPOSITION

This is a continuation of application Ser. No. 228,729, filed Feb. 23, 1972 now abandoned.

This invention relates to hardenable epoxy resin compositions.

More particularly, the invention relates to a hardenable epoxy resin composition which can be cured even at such low temperature as 0° to 5°C.

Still more particularly, the present invention relates to a rapidly hardenable epoxy resin composition from which can be obtained a hardened product having excellent physical properties.

As reactive curing agents for hardening epoxy resin, there have been conventionally used aliphatic polyamines, polyamides, aromatic polyamines, cyclic aliphatic polyamines, amino-substituted aliphatic alcohols and phenols and addition products of epoxides of low molecular weights containing oxirane oxygen and polyamines.

However, the curing of polyepoxides with such known conventional curing agents can be carried out rapidly only in a high temperature range, such as of 40° to 160°C., conventionally 60° to 120°C.

Further, as conventional catalysts for accelerating the curing of polyepoxides, there are known such strongly acidic substances as sulfuric acid and phosphoric acid, such aromatic sulfonic acids as toluene sulfonic acid and benzene sulfonic acid, such Lewis acids as boron trifluoride and stannic chloride, such boron trifluoride-amine complex salts as boron trifluoride-monoethylamine and boron trifluoride-piperidine, metallic alkoxides and chelates. However, none of them are sufficient for attaining the purposes of low temperature hardening. For example, Lewis acid catalysts are quite high in activity but they have the disadvantages that they will generate heat so violently as not to be controllable during curing and that their pot-life is so short that hardened products for practical use cannot be obtained. Further, stannous acylate catalysts are effective in such temperature range as from 40° to 160°C. but they have the disadvantages that, at such low temperatures as from 0° to 5°C., they will not only retard the curing reaction but also will be relatively rapidly hydrolyzed to lose their activity.

Further, the adducts of meta-xylylenediamine, meta-phenylenediamine or the like and phenol are used conventionally for hardeners of polyepoxides, so that hardened epoxy resins obtained with these hardeners are unsatisfactory in chemical-resistance and flexibility.

Accordingly, it has been desired to provide a hardenable epoxy resin composition, which has excellent physical properties, can be cured rapidly at a low temperature, such as from about 0° to 5°C., has a sufficient water-resistance, and can be cured under a severe condition, such as in water.

It is an object of this invention to provide new curing agents for preparing hardened epoxy resins.

It is a further object of this invention to provide hardenable epoxy resin compositions from which can be obtained hardened epoxy resins having excellent physical properties.

Another object of this invention is to provide new hardeners which can accelerate the hardening of epoxy resins in combination with other conventional curing agents so that there can be prepared hardened epoxy resins having excellent physical properties.

A further object of this invention is to provide epoxy resin compositions which are curable at low temperatures and from which can be obtained hardened epoxy resins having excellent physical properties.

A further object of this invention is to provide new hardeners which can harden epoxy resins rapidly at such low temperatures as from 0° to 5°C. and which can be used in combination with conventional curing agents to prepare hardened products having excellent physical properties.

A still further object of this invention is to provide rapidly curable epoxy resin compositions which contain special curing agents and which can be cured even at such low temperatures as from 0° to 5°C. and in the presence of water to form hardened products having excellent physical properties.

According to the present invention, there is provided a hardenable epoxy resin composition which contains as essential constituents A. at least one epoxy compound (I) which contains on the average more than one adjacent epoxy group per molecule and B. a hardener, or a reaction product or a mixture thereof obtained by reacting a reaction product or a mixture thereof of a phenol (a), a polyamine (b) and a carbonyl compound (c), with a phenol (d).

Such hardener to be used in this invention is at least one reaction product (II) produced by reacting 1. a reaction product (II-1) produced by reacting 1—1. a phenol (a) having at least one reactive hydrogen atom attached to the aromatic nucleus, which may be mononuclear or polynuclear, monocyclic or polycyclic, nonsubstituted or substituted by halogen atom, nitro group, alkyl group or alkoxy group, practically and preferably monovalent or divalent phenol, more preferably nonsubstituted phenol, an alkyl phenol and a bisphenol and 1–2. at least one molecule, preferably 1–6 molecules, more preferably 1–3 molecules, based on one molecule of said phenol (a), of a polyamine (b) having at least one active hydrogen atom attached to amino nitrogen atom per molecule, preferably having at least two active hydrogen atoms attached to aliphatic amino nitrogen atoms per molecule such as, for example, a diamine having two aliphatic amino groups and other polyamine, more preferably a polyamine having, on an average, at least two aliphatic primary amino groups per molecule and having no ring structure, such as, for example, an aliphatic diamine having two primary amino groups and polyalkylene polyamine, and a polyamine having, on an average, at least two aliphatic primary amino groups per molecule and having a ring structure, such as aromatic ring, alicyclic ring, heterocyclic ring, such as, for example, aminoalkyl substituted aromatic hydrocarbons and 1–3. at least one molecule, preferably from one molecular to one stoichiometric equivalent, based on one molecule of said phenol (a), of a carbonyl compound (c) (in this specification carbonyl compound (c) means a member selected from the group comprising a carbonyl compound and its reactive or functional derivative), preferably a lower aliphatic carbonyl compound, more preferably a lower aliphatic aldehyde or a reactive derivative of the lower aliphatic aldehyde, and 2. a phenol (d) of an amount sufficient to react with a part or all of active hydrogen atoms attached to amino nitrogen atoms of the reaction product (II-1), which may be mononuclear or polynuclear, monoring or polyring, nonsubstituted or substituted by halogen atom, nitro group, alkyl group or alkoxy group.

The epoxy compounds (I) which can be used in this invention include, for example, an epoxy compound which contains on the average more than one 1,2-epoxy group (preferably an epoxy compound which contains on the average more than one substituted or nonsubstituted glycidyl ether group, substituted or nonsubstituted glycidyl ester group, substituted or nonsubstituted N-substituted glycidyl group), epoxidized polyunsaturated compounds and other well known epoxy compounds which contain an adjacent epoxy group.

The epoxy compounds (I) which may be used in the compositions of this invention include, for example, epoxy compounds (I-1) containing on the average more than one substituted or nonsubstituted glycidyl ether group which is represented by the general formula:

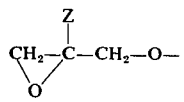

(wherein Z represents a hydrogen atom, a methyl group or an ethyl group) per molecule; epoxy compounds (I-2) containing on the average more than one substituted or nonsubstituted glycidyl ester group which is represented by the general formula:

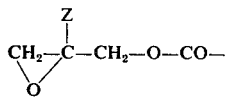

(wherein Z represents a hydrogen atom, a methyl group or an ethyl group) per molecule; epoxy compounds (I-3) containing on the average more than one substituted or nonsubstituted N-substituted glycidyl group which is represented by the general formula:

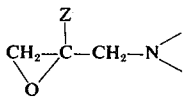

(wherein Z represents a hydrogen atom, a methyl group or an ethyl group) per molecule.

Said epoxy compounds (I-1) containing on the average more than one substituted or nonsubstituted glycidyl ether group per molecule, may be prepared by glycidyletherifying hydroxy compounds such as phenolic hydroxyl compounds or alcoholic hydroxyl compounds.

Examples of the preferable epoxy compounds (I-1) include, for example, polyglycidyl ethers (I-1-1) of polyhydric phenol containing one or more aromatic nuclei, polyglycidyl ethers (I-1-2) of alcoholic polyhydroxyl compounds derived by the addition reaction of polyhydric phenols containing one or more aromatic nuclei with alkylene oxides containing 2 to 4 carbon atoms, and polyglycidyl ethers (I-1-3) of alcoholic polyhydroxyl compounds containing one or more alicyclic rings.

Said polyhydric phenol polyglycidyl ethers (I-1-1) include, for example, epoxide compounds containing, as the main reaction product, polyglycidyl ethers obtained by reacting polyhydric phenols (D) containing at least one aromatic nucleus with epihalohydrins (e) in the presence of basic catalysts or basic compounds, such as sodium hydroxide, epoxide compounds obtained by reacting polyhalohydrin ethers, obtained by reacting polyhydric phenols (D) containing at least one aromatic nucleus with epihalohydrins (e) in the presence of catalytic amounts of acid catalysts such as boron trifluoride, with basic compounds such as sodium hydroxide and epoxide compounds obtained by reacting polyhalohydrin ethers, obtained by reacting polyhydric phenols (D) containing at least one aromatic nucleus with epihalohydrins (e) in the presence of catalytic amounts of basic catalysts such as triethyl amine, with basic compounds such as sodium hydroxide.

Such polyoxyalkylated polyhydric phenol polyglycidyl ethers (I-1-2) include, for example, epoxide compounds containing, as the main reaction product, polyglycidyl ethers obtained by reacting polyhalohydrin ethers, obtained by reacting polyoxyalkylated polyhydric phenols (E) derived by the addition reaction of polyhydric phenols containing at least one aromatic nucleus with alkylene oxides containing 2 to 4 carbon atoms, with epihalohydrins (e) in the presence of catalytic amounts of acid catalysts such as boron trifluoride, with basic compounds such as sodium hydroxide.

Said polyhydric phenols containing at least one aromatic nucleus (D) include polyhydric mononuclear phenols containing one aromatic nucleus (D-1), and polyhydric polynuclear phenols containing at least two aromatic nuclei (D-2).

Illustrative polyhydric mononuclear phenols (D-1) include, for example, resorcinol, hydroquinone, pyrocatechol, phloroglucinol, 1,5-dihydroxy naphthalene, 2,7-dihydroxy naphthalene, 2,6-dihydroxy naphthalene and the like.

Illustrative polyhydric polynuclear phenols (D-2) include dihydric polynuclear phenols having the following general formula (1);

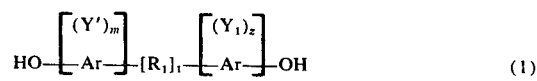

wherein: Ar is an aromatic divalent hydrocarbon group or radical such as naphthylene and phenylene, with phenylene being preferred for purposes of this invention: $Y'$ and $Y_1$, which can be the same or different, are alkyl groups such as methyl, n-propyl, n-butyl, n-hexyl, n-octyl and the like, preferably alkyl groups having a maximum of 4 carbon atoms, or halogen atoms, i.e., chlorine, bromine, iodine, or fluorine, or alkoxy groups such as methoxy, methoxymethyl, ethoxy, ethoxyethyl, n-butoxy, amyloxy and the like, preferably an alkoxy groups having a maximum of 4 carbon atoms (it is to be understood that whenever there are substituents exclusive of the hydroxyl groups on either or both of the aromatic divalent hydrocarbon groups, that these substituents can be the same or different); i is an integer having a value of 0 or 1; $m$ and $z$ are integers having a value of from 0 to a maximum value corresponding to the number of hydrogen atoms on the aromatic ring (Ar) which can be replaced by substituents and can have the same or different values; and $R_1$ is a divalent group or radical, as for example

or -O-, or -S-, or -SO-, or -SO$_2$-,
or a divalent hydrocarbon group as, for example, an alkylene group such as methylene, ethylene, trimethylene, tetramethylene, pentamethylene, hexamethylene, 2-ethyl hexamethylene, octamethylene, nonamethylene, decamethylene, and the like, an alkylidene group such as ethylidene, propylidene, isopropylidene, isobutylidene, amylidene, isoamylidene, 1-phenyl ethylidene and the like, or a cycloaliphatic group, such as 1,4-cyclohexylene, 1,3-cyclohexylene, cyclohexylidene and the like, or halogenated alkylidene, alkylene or cycloaliphatic groups, alkoxy and aryloxy substituted alkylidene, alkylene or cycloaliphatic groups, such as methoxy methylene, ethoxy methylene, ethoxy ethylene, 2-ethoxy trimethylene, 3-ethoxy pentamethylene, 1,4-(2-methoxycyclohexane), phenoxy ethylene, 2-phenoxy trimethylene, 1,3-(2-phenoxy cyclohexane), and the like, aralkylene groups, such as phenyl ethylene, 2-phenyl trimethylene, 1-phenyl pentamethylene, 2-phenyl decamethylene, and the like, aromatic groups, such as phenylene, naphthylene, and the like, halogenated aromatic groups, such as 1,4-(2-chlorophenylene), 1,4-(2-bromophenylene), 1,4-(2-fluorophenylene), and the like; alkoxy and aryloxy substituted aromatic groups, such as 1,4-(2-methoxyphenylene), 1,4-(2-ethoxyphenylene), 1,4-(2-n-propoxyphenylene), 1,4-(2-phenoxyphenylene), and the like, alkyl substituted aromatic groups, such as 1,4-(2-methylphenylene), 1,4-(2-ethylphenylene), 1,4-(2-n-propylphenylene), 1,4-(2-n-butylphenylene), 1,4-(2-n-dodecylphenylene) and the like, or $R_1$ can be a ring which is fused to one of the Ar groups as is the case, for example, in the compound having the formula:

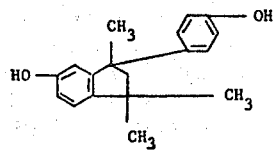

or $R_1$ can be a polyalkoxy group such as polyethoxy, polypropoxy, polythioethoxy, polybutoxy, polyphenylethoxy, or $R_1$ can be a group containing a silicon atom as, for example, polydimethylsiloxy, polydiphenylsiloxy, polymethylphenylsiloxy and the like, or $R_1$ can be two or more alkylene or alkylidene groups separated by an aromatic ring, a tertiary amino group, an ether linkage, a carbonyl group or separated by a linkage containing sulfur such as sulfur, sulfoxide and the like.

Particularly preferred as the dihydric polynuclear phenols are compounds having the general formula:

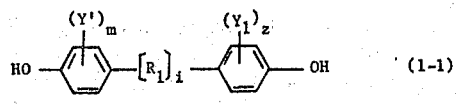

wherein $Y'$, $Y_1$ and $i$ are as previously defined, $m$ and $z$ have values of from 0 to 4 inclusive and $R_1$ is an alkylene or alkylidene group, preferably having from 1 to 3 carbon atoms inclusive or $R_1$ is a phenylene group having the formula:

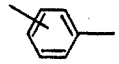

or $R_1$ is a saturated group having the formula:

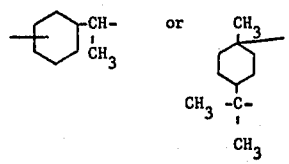

Exemplary of specific dihydric phenols include among others the bis-(hydroxyphenyl)-alkanes such as 2,2-bis-(p-hydroxyphenyl)-propane, commonly referred to as bisphenol-A, 2,4'-dihydroxy diphenylmethane, bis-(2-hydroxyphenyl)-methane, bis-(4-hydroxyphenyl)-methane, bis-(4-hydroxy-2,6-dimethyl-3-methoxyphenyl)-methane, 1,1-bis-(4-hydroxyphenyl)-ethane, 1,2-bis-(4-hydroxyphenyl)-ethane, 1,1-bis-(4-hydroxy-2-chlorophenyl)-ethane, 1,1-bis-(3,5-dimethyl-4hydroxyphenyl)-ethan 1,3-bis-(3-methyl-4-hydroxyphenyl)-propane, 2,2-bis-(3-phenyl-4-hydroxyphenyl)-propane, 2,2-bis-(3-isopropyl-4-hydroxyphenyl)-propane, 2,2-bis-(2-isopropyl-4-hydroxyphenyl)-propane, 2,2-bis-(4hydroxynaphthyl)-propane, 2,2-bis-(4-hydroxyphenyl)-pentane, 3,3-bis-(4-hydroxyphenyl)-pentane, 3,3-bis-(4-hydroxyphenyl)-heptane, bis-(4-hydroxyphenyl)-phenylmethane, bis-(4-hydroxyphenyl)-cyclohexylmethane, 1,2-bis-(4-hydroxyphenyl)-1,2-bis-(phenyl)-propane, 2,2-bis-(4-hydroxyphenyl)-1-phenylpropane and the like; dihydroxybiphenyls such as 4,4-dihydroxybiphenyl, 2,2'-dihydroxybiphenyl, 2,4-dihydroxybiphenyl and the like; di(hydroxyphenyl)-sulfone such as bis-(4-hydroxyphenyl)-sulfone, 2,4'-dihydroxydiphenyl sulfone, 5'-chloro-2,4'-di-hydroxydiphenyl sulfone, 5'-chloro-4,4'-dihydroxydiphenyl sulfone, 3'-chloro-4,4'-dihydroxy diphenyl sulfone and the like; di(hydroxyphenyl) ethers such as bis-(4-hydroxyphenyl)-ether, the 4,3'-, 4,2' -, 2,2'-, 2,3'-, di-hydroxy-diphenyl ethers, 4,4'-dihydroxy-2,6-dimethyldiphenyl ether, bis-(4-hydroxy-3-isobutylphenyl)-ether, bis-(4-hydroxy-3-isopropylphenyl)-ether, bis-(4-hydroxy-3-chlorophenyl)-ether, bis-(4-hydroxy-3-fluorophenyl)-ether, bis-(4-hydroxy-3-bromophenyl)-ether, bis-(4-hydroxynaphthyl)-ether, bis-(4-hydroxy-3-chloronaphthyl)-ether, bis-(2-hydroxbiphenyl)-ether, 4,4'-dihydroxy-2,6-dimethoxydiphenyl ether, 4,4'-dihydroxy-2,5-diethoxydiphenyl ether, and the like; also suitable are 1,1-bis-(4-hydroxyphenyl)-2-phenylethane, 1,3,3'-trimethyl-1-(4-hydroxyphenyl)-6-hydroxyindane, 2,4-bis-(p-hydroxyphenyl)-4-methylpentane and the like.

Other examples of dihydric dinuclear phenols are biphenols such as 4,4'-dihydroxy biphenyl, 3-methyl 4,4'-dihydroxy biphenyl, octachloro-4,4'-dihydroxy biphenyl and the like.

Also preferred are other dihydric polynuclear phenols having the general formula:

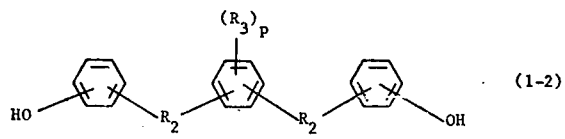

(1-2)

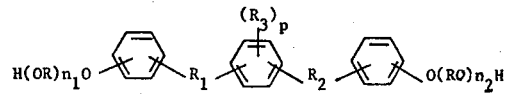

wherein $R_3$ is a methyl or ethyl group, $R_2$ is an alkylidene or other alkylene having from 1 to 9 carbon atoms, p ranges zero to 4. Examples of dihydric polynuclear phenols having the formula (1-2) include 1,4-bis-(4-hydroxybenzyl)-benzene, 1,4-bis-(4-hydroxybenzyl)tetramethylbenzene, 1,4-bis-(4-hydroxybenzyl)-tetraethylbenzene, 1,4-bis-( p-hydroxycumyl)benzene, 1,3-bis-(p-hydroxycumyl)-benzene and like.

Other examples of polyhydric polynuclear phenols (D-2) include, for example, pre-condensation products of phenols with carbonyl compounds, (for example, pre-condensation products of phenol resin, condensation products of phenols with acroleins, condensation products of phenols with glyoxal, condensation products of phenols with pentanediol, condensation products of resorcinols with acetone, and pre-condensation products of xylenes-phenols with formalin), condensation products of phenols with polychloromethylated aromatic compounds (for example, condensation products of phenols with bischloromethylxylene).

The polyoxyalkylated polyhydric phenols (E) here are compounds which are obtained by reacting the above-mentioned polyhydric phenols (D) having at least one aromatic nucleus with an alkylene oxide in the presence of such catalysts as will accelerate the reaction of the OH group and the epoxy group and which has atomic groups of —ROH (wherein $R$ is an alkylene group derived from an alkylene oxide) and/or —(RO)$_n$H (wherein $R$ is an alkylene group derived from an alkylene oxide, one polyoxyalkylene chain may contain different alkylene groups and n is an integer of 2 or more showing the polymerized number of oxyalkylene groups) bonded with said phenol residue by an ether bond. In this case, the ratio of alkylene oxide to said polyhydric phenol (D) is made more than 1 : 1 (mol : mol). But, preferably, the ratio of the alkylene oxide to the OH group of said polyhydric phenol (D) is 1 to 10 : 1 or particularly 1 to 3 : 1 by equivalents.

Said alkylene oxides include, for example, ethylene oxide, propylene oxide and butylene oxide, and particularly preferred are those which will bring forth branched chains in the case of producing ether linkages by their reaction with polyhydric phenols. Preferably examples thereof include propylene oxide and 2,3-butylene oxide, and a particularly preferable example thereof is propylene oxide.

Particularly preferred among the polyoxyalkylated polyhydric phenols (E) are those having the following general formula:

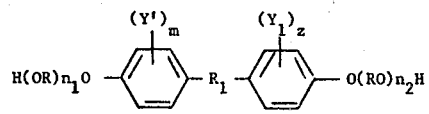

wherein $Y'$, $Y_1$, $m$, $z$ and $R_1$ have the same significance as defined for the general formula (1-1), R is an alkylene group containing 2 to 4 carbon atoms, and $n_1$ and $n_2$ range from 1 to 3.

In addition, preferred among the polyoxyalkylated polyhydric phenols (E) are those having the following general formula:

wherein $R_1$, $R_2$ and $R_3$ have the same significance as defined for the general formula (1-2), R is an alkylene group containing 2 to 4 carbon atoms, and $n_1$ and $n_2$ range from 1 to 3.

Further, as epoxy compounds (I-2) having an average of more than one substituted or nonsubstituted glycidyl ester group in the molecule, there are polyglycidyl esters of aliphatic polycarboxylic acids or aromatic polycarboxylic acids. For example, there is included an epoxy resin such as is obtained by polymerizing glycidyl methacrylate synthesized from an epihalohydrin (e) represented by the below-mentioned general formula (4) and methacrylic acid.

Further, as examples of epoxy compounds (I-3) having an average of more than one substituted or nonsubstituted N-substituted glycidyl group in the molecule, there can be enumerated epoxy resins obtained from aromatic amines (for example, aniline or aniline having alkyl substituent(s) in the nucleus) and epihalohydrins (e) represented by the below-mentioned general formula (4) and epoxy resins obtained from precondensates of aromatic amines and aldehydes (for example, aniline-formaldehyde precondensates or aniline-phenol-formaldehyde precondensates) and epihalohydrins (e).

Said polyhydric alicyclic alcohol polyglycidyl ethers (I-1-3) include, for example, epoxide compounds containing, as the main reaction product, polyglycidyl ethers obtained by reacting polyhydric alcohols (F) containing at least one alicyclic ring with epihalohydrins (e) in the presence of basic catalysts or basic compounds, such as sodium hydroxide, epoxy compounds obtained by reacting polyhalohydrin ethers, obtained by reacting polyhydric alcohols (F) containing at least one alicyclic ring with epihalohydrins (e) in the presence of catalytic amounts of acid catalysts such as boron trifluoride, with basic compounds such as sodium hydroxide and epoxide compounds obtained by reacting polyhalohydrin ethers, obtained by reacting polyhydric alcohols (F) containing at least one alicyclic ring with epihalohydrins (e) in the presence of catalytic amounts of basic catalysts such as triethyl amine, with basic compounds such as sodium hydroxide.

Similarly such polyglycidyl ethers (I-1-3) include, for example, epoxide compounds containing, as the main reaction product, polyglycidyl ethers obtained by reacting polyhalohydrin ethers, obtained by reacting polyhydroxyl compounds (G) derived by the addition reaction of polyhydric alcohols (F) containing at least one alicyclic ring with alkylene oxides containing 2 to 4 carbon atoms, with epihalohydrins (e) in the presence of catalytic amounts of acid catalysts such as boron trifluoride, with basic compounds such as sodium hydroxide.

Preferred examples of polyglycidyl ether (I-1-3) are polyglycidyl ethers derived from polyhydric alcohols containing at least one alicyclic ring and polyglycidyl ethers derived by an addition reaction of polyhydric alcohols containing at least one alicycle ring with an alkylene oxide containing 2 to 4 carbon atoms.

Said polyglycidyl ethers (I-1-3) can be prepared by the hydrogenation of aromatic rings of epoxide resins derived from polyhydric phenols containing at least one aromatic ring, such as polyglycidylethers of polyhydric phenols, to alicyclic rings, in which reaction usable catalysts are, for example, rhodium or ruthenium supported on a carrier, which are described in Japanese Patent Publication 42-7788 (7788/1967).

Said polyhydric alcohols containing at least one alicyclic ring (F) include polyhydric mononuclear alcohols containing one alicyclic ring (F-1), and polyhydric polynuclear alcohols containing at least two alicyclic rings (F-2).

Preferable polyhydric mononuclear alcohols (F-1) include dihydric mononuclear alcohols having the following formula (2):

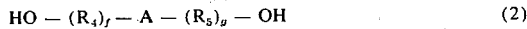

$$HO - (R_4)_f - A - (R_5)_g - OH \qquad (2)$$

wherein A represents a divalent cyclohexyl group which may be substituted by alkyl groups, such as methyl, n-propyl, n-butyl, n-hexyl, n-octyl and the like, preferably alkyl groups having a maximum of 4 carbon atoms, or halogen atom, i.e., chlorine, bromine, or fluorine, or alkoxy groups such as methoxy, methoxymethyl, ethoxy, ethoxyethyl, n-butoxy, amyloxy and the like, preferably an alkoxy group having a maximum of 4 carbon atoms, preferably nonsubstituted or substituted by halogen atoms in respect of character of flame-resistance: $R_4$ and $R_5$ which can be the same or different, are alkylene groups such as methylene, n-propylene, n-butylene, n-hexylene, n-octylene and the like, preferably alkylene groups having a maximum of 6 carbon atoms; $f$ and $g$ which can be the same or different, are 0 or 1, preferably 0.

Illustrative dihydric monocyclic alcohols having one cyclohexyl ring are, for example, substituted or nonsubstituted cyclohexanediol such as 1,4-cyclohexanediol, 2-methyl-1,4-cyclohexanediol, 2-chloro-1,4-cyclohexanediol, 1,3-cyclohexanediol, and the like, substituted or nonsubstituted dihydroxyalkyl-cyclohexane such as 1,4-dihydroxymethylcyclohexane, 1,4-dihydroxyethylcyclohexane, 1,3dihydroxyethylcyclohexane, 1,4-dihydroxypropylcyclohexane, 1,4-dihydroxybutylcyclohexane and the like.

Further, polyhydric mononuclear alcohols having one alicyclic ring except cyclohexyl ring, are substituted or nonsubstituted cycloalkylpolyol such as 1,3-cyclopentanediol, 1,4-cycloheptanediol, 1,3-cycloheptanediol, 1,5-perhydronaphthalenediol, 1,3-dihydroxy-2,2,4,4-tetramethylcyclobutane, 2,6-dihydroxydecahydronaphthalene, 2,7-dihydroxydecahydronaphthalene, 1,5-dihydroxydecahydronaphthalene and the like, and substituted or nonsubstituted polyhydroxyalkyl cycloalkane such as 1,3-dihydroxymethyl cyclopentane, 1,4-dihydroxymethylcycloheptane, 2,6-bis(hydroxymethyl)-decahydronaphthalene, 2,7-bis(hydroxymethyl)-decahydronaphthalene, 1,5-bis(hydroxymethyl)-decahydronaphthalene, 1,4-bis(hydroxymethyl)-decahydronaphthalene, 1,4-bis(hydroxymethyl)-bicyclo[2,2,2]-octane, dimethyloltricyclodecane.

Particularly preferred, by reason of economy, as polyhydric monocyclic alcohol is 1,4-dihydroxymethylcyclohexane.

Further, polyhydric polycyclic alcohols (F-2) are, for example, include polyhydric polycyclic alcohols having the following general formula (3):

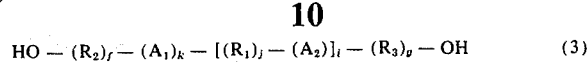

$$HO - (R_2)_f - (A_1)_k - [(R_1)_j - (A_2)_l - (R_3)_g - OH \qquad (3)$$

wherein: $A_1$ and $A_2$ are mono-ring or poly-ring divalent alicyclic hydrocarbon groups which may be substituted by alkyl groups, such as methyl, n-propyl, n-butyl, n-hexyl, n-octyl and the like (preferably alkyl groups having a maximum of 4 carbon atoms), or halogen atoms, i.e., chlorine, bromine, or fluorine or alkoxy groups such as methoxy, methoxymethyl, ethoxy, ethoxyethyl, n-butoxy, amyloxy and the like (preferably alkoxy groups having a maximum of 4 carbon atoms), or may not be substituted, preferably $A_1$ and $A_2$ are nonsubstituted or substituted by halogen atoms in respect of character of flame-resistance: $k$ and $l$ are 0 or 1, except $k$ and $l$ are 0 together: $R_1$ has the same significance as defined for the general formula (1), preferably methylene group, ethylene group or iso-propylene group in respect of character of flame-resistance: $j$ is 0 or 1: $R_2$ and $R_3$, which can be the same or different, are alkyl groups such as methyl, n-propyl, n-butyl, n-hexyl, n-octyl and the like, preferably alkyl groups having a maximum of 6 carbon atoms: $f$ and $g$ are 0 or 1, preferably 0: $i$ is an integer 0 or more than 0, preferably 0 or 1.

Particularly preferable polyhydric polycyclic alcohols (F-2) are dihydric polycyclic alcohols having the following general formula (3-1):

$$HO - A_1 - (R_1)_j - A_2 - OH \qquad (3-1)$$

wherein: $A_1$, $A_2$, $R_1$ and $j$ have the same significance as defined for the general formula (3).

Preferable examples of such dihydric polycyclic alcohols are substituted or nonsubstituted bicyclo alkanediol such as 4,4'-bicyclohexanediol, 3,3'-bicyclohexanediol, octachloro-4,4'-bicyclohexanediol and the like, or bis-(hydroxycycloalkyl)-alkane such as 2,2-bis-(4-hydroxycyclohexyl)-propane, 2,4'-dihydroxydicyclohexylmethane, bis-(2-hydroxycyclohexyl)-methane, bis-(4-hydroxycyclohexyl)-methane, bis-(4-hydroxy-2,6-dimethyl-3-methoxycyclohexyl)-methane, 1,1-bis-(4-hydroxycyclohexyl)-ethane, 1,1-bis-(4-hydroxycyclohexyl)-propane, 1,1-bis-(4-hydroxycyclohexyl)-butane, 1,1-bis-(4-hydroxycyclohexyl)-pentane, 2,2-bis-(4-hydroxycyclohexyl)-butane, 2,2-bis-(4-hydroxycyclohexly)-pentane 3,3-bis-(4-hydroxycyclohexyl)- pentane, 2,2-bis-(4-hydroxycyclohexyl)-heptane, bis-(4-hydroxycyclohexyl) -phenylmethane, bis-(44-hydroxycyclohexyl)-cyclohexylmethane, 1,2-bis-(4-hydroxycyclohexyl)-1,2-bis-(phenyl)-propane, 2,2-bis-(4-hydroxycyclohexyl)-1-phenylpropane, 2,2-bis-(4-hydroxy-3-methylcyclohexyl)propane, 2,2-bis-(4-hydroxy-2-methyl-cyclohexyl)propane, 1,2-bis-(4-hydroxycyclohexyl)ethane, 1,1-bis-(4-hydroxy-2-chloro-cyclohexyl)ethane, 1,1-bis-(3,5-dimethyl-4-hydroxycyclohexyl)ethane, 1,3-bis-(3-methyl-4-hydroxycyclohexyl)propane, 2,2-bis-(3,5-dichloro-4-hydroxycyclohexyl)propane, 2,2-bis-(3-phenyl-4-hydroxycyclohexyl)propane, 2,2-bis-(3-iso-propyl-4-hydroxycyclohexyl)-propane, 2,2-bis-(2-iso-propyl-4-hydroxycyclohexyl)propane, 2,2-bis-(4-hydroxyperhydronaphthyl)propane, and the like, dihydroxycycloalkane such as 4,4'-dihydroxydicyclohexane, 2,2-dihydroxybicyclohexane, 2,4-dihydroxybicyclohexane, and the like, di-(hydroxycycloalkyl)-sulfone such as bis-(4-hydroxycyclohexyl)-sulfone, 2,4'-dihydroxy-dicyclohexylsulfone, chloro-2,4-dihydroxydicyclohexylsulfone, 5-chloro-4,4'-dihydroxydicyclohexylsulfone, 3'- chloro-4,4'-dihydrocyclohexylsulfone and the like, di-(hydroxycycloalkyl)ether such as bis-(4-hydroxycyclohexyl)ether, 4,3'-( or 4,2'- or 2,2'- or 2,3'-) dihydroxydicyclohexylether, 4,4'-dihydroxy-2,6-dimethyldicyclohexylether, bis-(4-hydroxy-3-iso-butylcyclohexyl)ether, bis-(4-hydroxy-3-iso-propylcyclohexyl)ether, bis-(4-hydro-3-chlorocyclohexyl)ether, bis-(4-hydroxy-3-fluorocyclohexyl)ether, bis-(4-hydroxy-3-bromocyclohexyl)ether, bis-(4-hydroxy-perhydronaphthyl)ether, bis-(4-hydroxy-3-chloro-perhydronaphthyl) ether, bis-(2-hydroxybicyclohexyl)ether, 4,4'-dihydroxy-2,6-dimethoxydicyclohexylether, 4,4'-dihydroxy-2,5-diethoxydicyclohexylether, and the like, 1,1-bis-(4-hydroxycyclohexyl)2-phenylethane, 1,3,3-trimethyl-1-(4-hydroxycyclohexyl)-6-hydroxyindane, 2,4-bis-(p-hydroxycyclohexyl)-4-methylpentane.

Examples of a preferable group of such dihydric polycyclic alcohols are compounds having the following general formula (3-2):

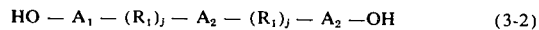 (3-2)

wherein: $A_1$, $A_2$, $R_1$ and j have the same significance as defined for the general formula (3) and two $R_1$, two j and two $A_2$ are the same or different each other.

Examples of such dihydric polycyclic alcohols are, 1,4-bis(4-hydroxycyclohexylmethyl)-cyclohexane, 1,4-bis(4-hydroxy-cyclohexylmethyl)-tetramethylcyclohexane, 1,4-bis(4-hydroxycyclohexylmethyl)-tetraethylcyclohexane, 1,4-bis(p-hydroxycyclohexyl-isopropyl)-cyclohexane, 1,3-bis(p-hydroxycyclohexyl-isopropyl)-cyclohexane and the like.

Examples of other preferable group of such dihydric polycyclic alcohols are the compounds having the following general formula (3-3):

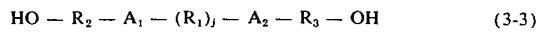 (3-3)

wherein: $A_1$, $A_2$, $R_1$, $R_2$, $R_3$ j have the same significance as defined for the general formula (3).

Examples of such dihydric polycyclic alcohols are substituted or nonsubstituted dihydroxyalkylbicycloalkane, such as 4,4'-dihydroxymethylbicyclohexane and substituted or unsubstituted bis(hydroxyalkylcycloalkyl)alkane, such as 1,2-bis(4-hydroxymethylcyclohexyl)-ethane, 2,2-bis(4-hydroxymethylcyclohexyl)-propane, 2,3-bis(4-hydroxymethylcyclohexyl)-butane, 2,3-dimethyl-2,3-bis-(4-hydroxymethylcyclohexyl)-butane and the like.

The polyhydroxyl compound (G) here is a compound which is obtained by reacting the above-mentioned polyhydric alcohols (F) having at least one alicyclic rings with an alkylene oxide in the presence of such catalysts as will accelerate the reaction of the OH group and the epoxy group and which has atomic groups of —ROH (wherein R is an alkylene group derived from an alkylene oxide) and/or —(RO)$_n$H (wherein R is an alkylene group derived from an alkylene oxide, one polyoxyalkylene chain may contain different alkylene groups and n is an integer of 2 or more showing the polymerized number of oxyalkylene groups) bonded with said phenol residue by an ether bond. In this case, the ratio of alkylene oxide to said polyhydric alcohols (F) is made more than 1 : 1 (mol : mol). But, preferably, the ratio of the alkylene oxide to the OH group of said polyhydric alcohol (F) is 1 to 10 : 1 or particularly 1 to 3 : 1 by equivalents.

Said alkylene oxides include, for example, ethylene oxide, propylene oxide and butylene oxide, and particularly preferred are those which will bring forth branched chains in the case of producing ether linkages by their reaction with polyhydric phenols. Preferable examples thereof include propylene oxide and 2,3-butylene oxide, and particularly preferable example thereof is propylene oxide.

A particularly preferable group among the polyhydroxyl compounds (G) is those having the following general formula:

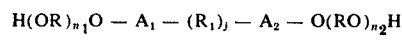

wherein $A_1$, $A_2$, j and $R_1$ have the same significance as defined for the general formula (3-1), R is an alkylene group containing 2 4 carbon atoms, and $n_1$ and $n_2$ range from 1 to 3.

In addition, a preferable group among the polyhydroxyl compounds (E) is those having the following general formula:

wherein $A_1$, $A_2$, j and $R_1$ have the same significance as defined for the general formula (3-2 ), R is an alkylene group containing 2 to 4 carbon atoms, and $n_1$ and $n_2$ range from 1 to 3.

A specially preferable group among the polyhydroxyl mono- or polynucleus alcohols (F) is alcohols having one or 2 cyclohexane-ring as alicyclic ring, 2,2-bis-(4-hydroxycyclohexyl)-propane.

The epihalohydrin (e) is represented by the following general formula (4):

 (4)

wherein Z represents a hydrogen atom, a methyl group or an ethyl group, and X' represents a halogen atom.

Examples of epihalohydrins (e) include, for example, epichlorohydrin, epibromohydrin, 1,2-epoxy-2-methyl-3-chloropropane, 1,2-epoxy-2-ethyl-3-chloropropane.

Examples of acid catalysts which can be used for accelerating the reaction of epihalohydrins (e) with polyhydric phenols (D), polyhydroxyl compounds (E), polyhydric alcohols (F) or polyhydroxyl compounds G include, for example, Lewis acids such as boron trifluoride, stannic chloride, zinc chloride and ferric chloride, active derivatives of Lewis acid such as boron trifluoride etherate and mixtures thereof.

Examples of basic catalysts which can be used for accelerating the reaction of epihalohydrins (e) with polyhydric phenols (D), polyhydric alcohols (F) or polyhydroxyl compounds (G) include, for example, alkali -dimethanol metal hydroxides such as sodium hydroxide, alkali metal alcoholates such as sodium ethylate, tertiary amines such as triethyl amine and triethanol amine, quaternary ammonium compounds such as tetramethylammonium bromide, and mixtures of them.

Examples of basic compounds which can be used for preparing glycidyl ethers at the same time when epihalohydrins (e) react with polyhydric phenols (D), polyhydric alcohols (F) or polyhydroxyl compounds (G) or for preparing glycidyl ethers by dehydrohalogenating halohydrin ethers obtained by reacting epihalohydrins (e) with polyhydric phenols (D) include, for example, alkali metal hydroxides such as sodium hydroxide, alkali metal aluminates such as sodium aluminate, and the like.

These catalysts or basic compounds can be used as they are or in the form of solutions in suitable inorganic and/or organic solvents.

The acid catalysts have a large catalytic effect among these catalysts which can be used for accelerating the reaction of epihalohydrins (e) with polyhydric phenols (D), polyhydroxyl compounds (E), polyhydric alcohols (F) or polyhydroxyl compounds (G).

Further, polyglycidyl ethers obtained by the reaction of epihalohydrins and the mixture of the above-mentioned polyhydric alcohols, can be used as epoxy compounds of the present invention.

Examples of epoxidized poly-unsaturated compounds (I-4) include, for example, epoxidized polybutadiene (what is called oxiron), vinylcyclohexenedioxide, limonenedioxide, dicyclopentadienedioxide, bis(3,4-epoxy-cyclohexylmethyl)-phthalate, diethyleneglycol-bis(3,4-epoxy-cyclohexene carboxylate), 3,4-epoxy-6-methyl-cyclohexylmethyl-3,4-epoxy-6-methylcyclohexane carboxylate, 3,4-epoxy-hexahydrobenzal-3,4nonsubstituted. 1,1-dimethanol and ethyleneglycol-bis(3,4-epoxy-tetrahydrodicyclopentadien-8-yl)-ether.

Further, well known epoxy resins which contain adjacent epoxy group, for example, various epoxy resins disclosed in various literatures, such as "Production and Use of Epoxy Resins" (edited by Hiroshi Kakiuchi) can be used. Phenols (a) which can be used for preparing the reaction product (II) in the present invention may be monocyclic or polycyclic, may be mononucleus or polynucleus, and may be substituted by halogen atoms, nitro groups, alkyl groups and alkoxy groups, or nonsubstituted.

Preferred examples of phenols (a) include substituted or nonsubstituted monohydric monouclear phenols (a-1) having the following general formula (5):

$$HO - (Ar_1) - (X)_{m-1} \qquad (5)$$

wherein $Ar_1$ represents an aromatic hydrocarbon group which may be mono- or polyring and may be mono- or polynuclear: X represents halogen atom, alkyl group or alkoxy group and these substituents can be the same or different: m represents an integer having a value of from 0 to a maximum value corresponding to the number of substitutable hydrogen atoms on the aromatic ring ($Ar_1$).

Particularly preferable examples of such monohydric phenols (a-1) are nonsubstituted phenols, such as phenol and naphthol, alkyl phenols, such as o-, m-, or p-cresol, p-tert.-butyl-phenol, octylphenol, nonylphenol, xylenol and ethylphenol, halogenated phenols, such as chlorophenol, and alkoxyphenols, such as anisole, and particularly preferable examples are nonsubstituted phenols and alkyl phenols.

Another preferable phenols (a) are divalent polynuclear phenols (a-2) having at least one substitutable hydrogen atoms on the aromatic ring.

Examples of such divalent polynuclear phenols (a-2) include the abovementioned compounds (polyhydric phenols (D)), and practically and particularly preferable compounds are nonsubstituted dihydric dinuclear phenols having the general formula (1—1) (but m and z are 0).

Other examples of phenols (a) include, for example, polyvalent mononuclear phenols, such as resorcinol and polyvalent polynuclear phenol.

Since generally reactive positions on the aromatic ring are ortho or para position to a phenolic hydroxyl radical, preferable phenols are phenols having at least one nonsubstituted positions, i.e., hydrogen atoms at ortho or para position to a phenolic hydroxyl radical on the aromatic ring. The hardeners made from such phenols have good solubility with epoxy resins.

Preferable polyamines (b), which can be used in the present invention, having at least 2 amino nitrogen atoms per molecule and having at least one active hydrogen atom include:

Aliphatic diamines, having no ring structure, such as straight chain diamines having 2–8 carbon atoms, i.e., ethylene diamine, trimethylene diamine, hexamethylene diamine, octamethylene diamine and the like, and aliphatic polyamines, having no ring structure, such as straight chain polyamines, such as diethylenetriamine, triethylenetetramine, pentaethylenehexamine, heptaethyleneoctamine.

Other straight or branched chain aliphatic polyamines having no ring structure include decamethylenediamine, undecamethylenediamine, tripropylenetetramine, tetrapropylenepentamine and the like, and tetra-(aminomethyl)-methane, -tetrakis-2-aminoethylaminomethyl)methane, nonaethylenedecamine, 1,3-bis(2'-aminoethylamine)propane, triethylene-bis-(trimethylene)-hexamine, bis-(3-aminotheyl)amine, and the like.

Aliphatic diamines having aromatic ring(s) or amino alkyl substituted aromatic hydrocarbons, which constitute one group of preferable polyamines (b), include ortho-xylylenediamine, meta-xylylene-diamine, para-xylylenediamine and the like.

Aliphatic diamines having alicyclic ring(s) include 1,4-cyclohexandediamine, 4,4'-methylene-bis-cyclohexylamine, 4,4'-iso-propylinene-bis-cyclohexylamine and the like.

Aliphatic diamines having heterocyclic ring(s) include 1,4-bis-(3-aminopropyl)-piperazine and the like.

Other polyamines (b) having ring structure, include piperazine-1,4-diazacycloheptane, 1-(2'-aminoethyl)-piperazine, 1-[2'-(2''-amino-ethylamino)-ethyl]-piperazine, 1,11-diazacycloeicosane, 1,15-diazacyclooctacosane and the like.

The hardeners made from such polyamines having ring structure harden epoxy compounds to produce a cured product having good chemical resistance.

Other polyamines (b) include, for example, aromatic polyamines (b-2). Aromatic polyamines (b-2) include polynuclear aromatic polyamines (b-2-1) having the following general formula (6):

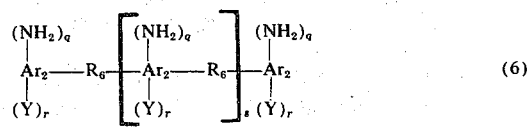

$$(6)$$

wherein: $Ar_2$ represents mononuclear or two-nuclear aromatic group: Y represents alkyl group or alkoxy group having 1–4 carbon atoms, hydroxyl group or halogen atoms: $q$ is 1 or 2: r is an integer having a value of from 0 to a maximum value corresponding to the number of hydrogen atoms on the aromatic ring ($Ar_2$) which can be replaced by substituents and can be the same or different: $R_6$ is alkylene group, oxyalkylene group or divalent aliphatic group having ether-like oxygen atom (bonding C-O-C), having 1-3 carbon atoms and straight or branched chain: s is an integar 0 or more than 0.

Examples of the polynuclear aromatic polyamines (b-2-1) are the compounds having the following general formula (6-1):

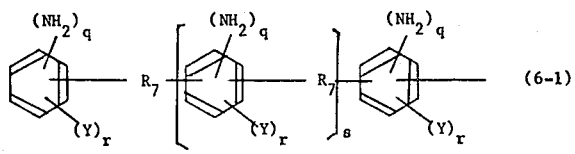  (6-1)

wherein: Y, q and r have the same significance as defined for the general formula (6): $R_7$ is methylene group or oxymethylene group: s is an integer of 0 or more than 0, preferably more than 0. Mononuclear aromatic amines corresponding to

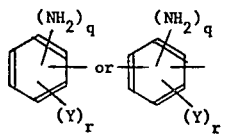

in general formula (6-1) are the compounds having the following general formula (6-1-1):

  (6-1-1)

wherein Y, a substituent of the aromatic nucleus, is alkyl group or akoxy group, having 1-4 carbon atoms, hydroxyl group or halogen atom: $q$ is 1 or 2: $r$ is an integer having a value of from 0 to 4 or a maximum value corresponding to the number of hydrogen atoms on the aromatic ring which can be replaced by substituents.

Aromatic polyamines, having the general formula (6-1), can be produced by bonding at least 2 moles of mononuclear aromatic amines with a methylene bridge or oxymethylene bridge by the reaction of mononuclear aromatic polyamines having the general formula (6-1-1) and an aldehyde or reactive derivatives of an aldehyde in a regular method.

Illustrative mononuclear aromatic amines having the general formula (6-1-1) include mononuclear aromatic amines having at least one reactive position on aromatic amines. Preferable examples of such mononuclear aromatic amines are aniline and substituted anilines by alkyl group on aromatic nucleus such as toluidine, ethylaniline and xylidine.

Aromatic polyamines having the general formula (6) include the compounds having the following general formula (6-2):

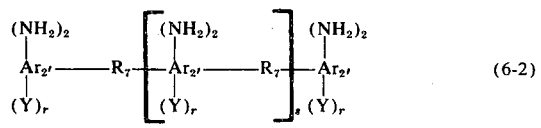  (6-2)

wherein: $Ar_{2'}$ represent a dinuclear aromatic group: Y and r have the same significance as defined for the general formula (6): $R_7$ is a methylene group or oxymethylene group: s is an integer of 0 or more than 0, preferably more than 0.

Dinuclear aromatic diamines corresponding to

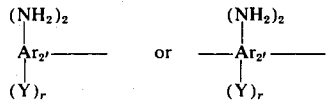

in the general formula (6-2) are the compounds having the following general formula (6-2-1):

$$(Y)_r - Ar_{2'} - (NH_2)_2 \qquad (6\text{-}2\text{-}1)$$

wherein $Ar_{2'}$, Y and r have the same significance as defined for the general formula (6). A preferable group of dinuclear aromatic diamines having the general formula (6-2-1) are diamines having the following general formula (6-2--1):

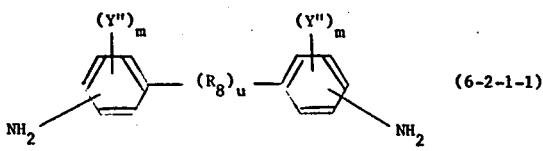  (6-2-1-1)

wherein: $R_8$ is alkylene group having straight or branched chain, —O—, —$SO_2$— or —CO—: Y'' is alkyl group having 1-4 carbon atoms or methoxy group: $m$ is 0 or 1: $u$ is 0 or 1.

A particularly preferable group of diamines having the general formula (6-2-1-1) are diamines having the following general formula:

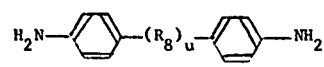

wherein: $R_8$ and u have the same significance as defined for the general formula (6-2-1-1).

Examples of such particularly preferable diamines are benzidine, 4,4'-diaminodiphenylmethane, 2,2-bis(4-aminophenyl)propane, 4,4'-diaminodiphenylether, 4,4'-diaminodiphenylsulfone, 4,4'-diaminobenzophenone and the like.

Other examples of dinuclear aromatic diamines having the general formula (6-2-1-1) are 2,2'-dimethyl-4,4'-diaminodiphenylmethane, 2,4'-diaminobiphenyl, 3,3'-dimethyl-4,4'-diamino-biphenyl, 3,3'-dimethoxy-4,4'-diamino-biphenyl and the like.

The aromatic polyamines having the general formula (6-2) can be produced by bonding dinuclear aromatic amines with methylene bridge or oxymethylene bridge with the reaction of dinuclear aromatic polyamines having the general formula (6-2-1) and an aldehyde or reactive derivatives of an aldehyde in regular method.

Examples of the aldehydes or reactive derivatives of aldehydes are lower aliphatic aldehyde such as formaldehyde, paraformaldehyde, acetoaldehyde, chloral, preferable formaldehyde or reactive derivatives of formaldehyde. Formaldehyde and the like can be used in the form of an aqueous solution or a solution of an organic solvent such as methanol.

Carbonyl compounds (c) to be used in the present invention are compounds having more than one —CHO group or >C=O group in a molecule and its reactive or functional derivatives including their polymeric forms, e.g. paraformaldehyde. Such carbonyl compounds (c) include formaldehyde, paraformaldehyde, crotonaldehyde, acetoaldehyde, furfural, adipaldehyde, succinicaldehyde, glyoxal and acetone.

Preferable carbonyl compounds and their reactive derivatives are aldehydes and reactive derivatives of aldehyde, for example, lower aliphatic aldehyde, such as formaldehyde, paraformaldehyde, acetoaldehyde and chloral, particularly preferable are formaldehyde or reactive derivatives of formaldehyde.

Phenols (d) to be used in the present invention as masking agent include the above-mentioned phenols (a) and phenols having no reactive position in aromatic nucleus, which may be the same or different with the phenols (a).

Preferable phenols (d) are phenols substituted by alkyl group, such as cresol, xylenol and nonyl phenol.

The condensation products or reaction products (II-1) of phenols (a), polyamines (b), and carbonyl compounds (c) can be produced by one reaction process of all reactants, i.e., phenols (a), polyamines (b) and carbonyl compounds (c), but preferably are produced by more than two reaction processes in parts, for example, the procedure consisting of addition of carbonyl compounds (c) to the mixture of phenols (a) and polyamines (b), the procedure consisting of reaction of polyamines (b) with the reaction products of phenols (a) and carbonyl compounds (c), or the procedure consisting of reaction of phenols (a) with the reaction products of polyamines (b) and carbonyl compounds (c).

The compounds reactive with carbonyl compound (c), for example, xylene and the like, can be added at the time of the production of the reaction products (II-1).

When the condensation products or reaction products (II-1) is made from phenols (a), polyamines (b) and carbonyl compounds (c), the ratio of phenols (a), polyamines (b) and carbonyl compounds (c) is that carbonyl compounds (c) can be used in the ratio, corresponding to phenols (a), from 1 mole to 1 stoichiometric equivalent, and polyamines (b) can be used in more than 1 mole corresponding to 1 mole of phenols (a), and may be used in much excess.

The preferable mole ratio of phenols (a), polyamines (b) and carbonyl compounds (c) is 1 : 1-3 : 1-3. Using a different expression, a sufficient amount and a preferably not excess amount of carbonyl compounds (c) for bonding phenols (a) and polyamines (b) is demanded, and an amount of polyamines (c) which will leave preferably on the average at least one unreacted amino group (preferably primary amino group) per one polyamine molecule after the reaction of phenols (a), polyamines (b) and carbonyl compounds (c) is demanded.

Liquid reaction products (II-1) of phenols (a), polyamines (b) and carbonyl compounds (c) are preferable for use as reactant for the following reactions. There is no limitation in the reaction temperature when phenols (a), polyamines (b) and carbonyl compounds (c) are reacted, but when carbonyl compounds are added to the reaction system, but preferably, the reaction temperature is lower than 40°C. and after the addition of all carbonyl compounds (c), it is raised and the reaction is concluded. On this occasion, the reaction already starts when the reaction temperature is lower than 40°C., and the reaction concludes with a raised reaction temperature.

After the reaction, the reaction products (II-1) can be obtained by means of the removal of water, unreacted materials and solvent if any, by heating the reaction mixture at a reduced pressure.

Further, the masked products or reaction products (II), i.e. hardener, can be obtained by means of a reaction of phenols (d) with the reaction products (II-1), which are obtained from phenols (a), polyamines (b) and carbonyl compounds (c), at the ratio of 0.1-1.0 : 1 (equivalence of phenolic hydroxy group of phenols (d): equivalence of active hydrogen atom attached to amino nitrogen atom) preferably 0.4-1.0 : 1 (equivalence of phenolic hydroxy group of phenols (d): equivalence of primary amino group not yet reacted of the reaction product (II-1), at the temperature of 10°-150°C., preferably 40°-70°C. for a suitable time, for example, 10-30 minutes.

A preferable hardener to be used in present invention is prepared by the reaction of a reaction product (II-1), described hereunder, and alkyl phenol, e.g. cresol, nonylphenol as a phenol (d) in the ratio of 1 : 0.1-1 (equivalence of active hydrogen atoms attached to amino nitrogen atom: equivalence of hydroxy group of a phenol (d)), more preferably in the ratio from 1 : 1 (mole of a phenol (a) : mole of a phenol (d)) to 1 : 1 (mole of a polyamine (b) : mole of a phenol (d)), and such a preferable reaction product (II-1) is prepared by the reaction of 1 mole of a monovalent or divalent phenol, 1-3 moles of a polyamine which has two primary aliphatic amino group per molecule and may have aromatic nucleus or not and 1-3 moles of formaldehyde or its reactive derivative as a carbonyl compound (c).

A particularly preferable hardener to be used in present invention is prepared by the reaction of a reaction product (II-1), described hereunder, and alkyl phenol, e.g. cresol or nonylphenol as a phenol (d) in the ratio of 1 : 0.1-1 (equivalence of active hydrogen atoms attached to amino nitrogen atom: equivalence of hydroxy group of a phenol (d)), more preferably in the ratio from 1 : 1 (mole of a phenol (a): mole of a phenol (d)) to 1 : 1 (mole of a polyamine (b): mole of a phenol (d)), and such a preferable reaction product (II-1) is prepared by the reaction of 1 mole of a phenol, and alkyl phenol, e.g. cresol or a bisphenol, e.g. 2,2-bis(4-hydroxy phenyl)-propane, as a phenol (a), 1-3 moles of an alkylene diamine, e.g. ethylene diamine, hexamethylene diamine, a polyalkylene polyamine, e.g. trimethylene tetramine or an amino alkyl substituted aromatic hydrocarbon, e.g. xylylene diamine as a polyamine (b), and 1-3 moles of formaldehyde or its reactive derivatives e.g. paraformaldehyde as a carbonyl compound (c).

With regard to the ratios of the epoxy compound (I) and the hardener or the reaction product (II) used pursuant to the invention, from 0.01 to 45 percent by weight, preferably 15 to 35 percent, by weight of the reaction product (II), based on the weight of the epoxy compound (I), may be added to the epoxy compound (I). As a method of adding the hardener (II), it may be dissolved directly into the epoxy compound (I), or it may be dissolved into a proper solvent and may be combined with the epoxy compound (I) when the composition is hardened.

Any other hardener and any other additive may be added, as required, to the polyepoxide hardenable composition according to the present invention. As examples of such additives, there can be enumerated, for example, silica powders, bitumens, celluloses, glass fibers, clays, micas, aluminum powders, aerosols and the like.

An effect of the present invention is to be able to provide a hardenable epoxy compound composition which can be hardened within a short time even at such low temperature as from 0° to 5°C.

Other effect of the present invention is to be able to provide a hardenable epoxy compounds composition which can be hardened within a shorter time than in the case of any conventional epoxy resin at a room temperature or a higher temperature.

The hardened product of the hardenable epoxy resin composition according to the present invention has physical properties better than those of any conventional epoxy resin hardened product and is remarkably higher in such properties as, for example, the adhesion strength (tensile shearing strength), hardness and chemical resistance.

Other effect of the present invention is to be able to provide a hardenable epoxy compound composition which has good preservability in the presence of carbon dioxide gas and/or moisture.

Another effect of the present invention is to be able to provide a hardenable epoxy compound composition which can be hardened at low temperature in the presence of water.

The invention will be further described with reference to the following examples. It will be understood that the invention is not limited to these specific embodiments.

In this description, the "condensation product" means the above-mentioned "reaction product (II-1)" and the "hardener" means the above-mentioned "reaction product (II)"

EXAMPLE 1 AND COMPARATIVE EXAMPLE 1

Preparation of condensation product [I] and hardener [II]

1 mole of phenol and 3 moles of ethylenediamine are mixed at room temperature in a three-necked 1l flask, equipped with agitator, thermometer and dropping funnel.

Phenol is dissolved in ethylenediamine by heating the mixture at 40°–50°C.

243.3 grams (3 moles) of 37 percent (w/w) formalin is added dropwise to this mixture slowly enough not to raise the temperature more than 40°C.

The reaction is continued for 1 hour at 40°C. and then 1 hour at 80°C. and then the reaction is concluded.

309 grams of the condensation product [I] is obtained by distillation under reduced pressure.

Active organic hardener [II] of which the end amino radical is masked partially, is made by the reaction of 200 grams of the condensation product [I] and 50 grams of nonylphenol as coupling agent, for one hour at 60°C. It is assumed that the condensation process, by which the condensation product [I] is produced, is represented by the following equation:

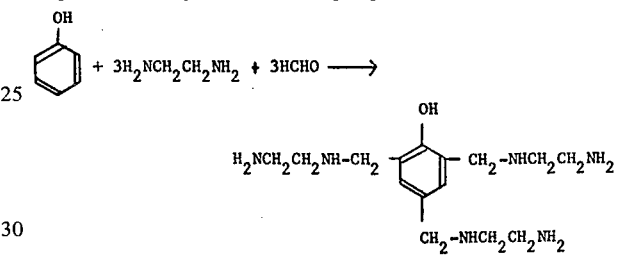

And the masking process for producing the hardener [II] is represented by the following equation:

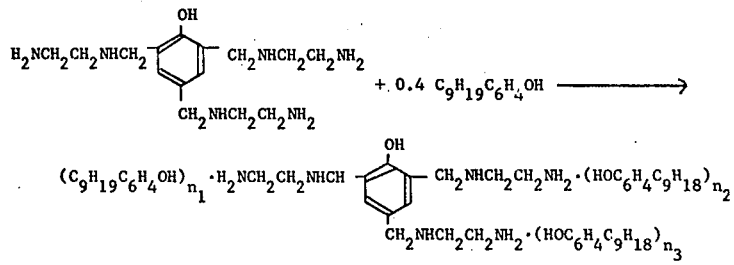

wherein $n_1 + n_2 + n_3 = 0.4$

EXAMPLE 2 AND COMPARATIVE EXAMPLES 2 AND 3

Epoxy resin and condensation product [I], hardener [II] or other hardener are mixed in the ratio (in parts by weight) illustrated on table 1, and the thus obtained hardenable compositions were cured at various temperatures, and examined.

The results of the measurements are shown in Table 1.

Table 1

|  | Example | Comparative example | |
|---|---|---|---|
|  | 2 | 2 | 3 |
| Epoxy resin 1[1] | 75 | 75 | 75 |
| Epoxy resin 2[2] | 25 | 25 | 25 |
| Condensation product [I] |  | 20 |  |
| Hardener [II] | 30 |  |  |
| Triethylene tetramine |  |  | 10 |
| Gell time at 0°C.[3] (in hours) | 10–13 | 17–20 | not gelling after 1 day |
| Tack-free time[4] (in minutes) | 70 | 110 | 130 |
| Gell time at 5°C.[5] (in hours) | 4 | 1–8 | 13–16 |
| An appearance of film cured at room temperature |  |  |  |
| Cissing[6] | A | B | C |
| Specular gloss[7] | A | B | C |
| Blooming[6] | A | B | C |
| Sweating[6] | A | B | C |

Table 1-continued

|  | Example 2 | Comparative example 2 | Comparative example 3 |
|---|---|---|---|
| Adhesive bonding strength of mortar[8] (Kg/cm$^2$) | 38 | 16 | 2–3 |

Notes:
[1]Epoxy resin 1: polyglycidylether of 2,2-bis-(4-hydroxyphenyl)-propane having an epoxy equivalent of about 190.
[2]Epoxy resin 2: diglycidylether obtained by additionally reacting on the average 2.2 moles of propylene oxide with 1 mole of 2,2-bis-(o-hydroxyphenyl)-propane, having an epoxy equivalent of about 345.
[3]The weight of epoxy resin composition is 50 grams.
[4]The time (minutes) to tack-free feeling with finger.
[5]The weight of epoxy resin composition is 50 grams.
[6]A: not found, B: found, C: much found
[7]A: much found, B: a little found, C: not found
[8]The bonding strength of mortar brick (4$^{cm}$×4$^{cm}$×10$^{cm}$) dipped in water for 7 days after adhesion in water.

EXAMPLE 3 AND COMPARATIVE EXAMPLE 4

Preparation of condensation product [III] and hardener [IV]

1 mole of phenol and 2 moles of hexamethylenediamine are mixed at room temperature in a three-necked 1l flask, equipped with agitator, thermometer and dropping funnel.

Phenol is dissolved in hexamethylenediamine by heating the mixture at 40°–50°C.

162.2 grams (2 moles) of 37 percent (w/w) formalin is added dropwise to this mixture slowly enough not to raise the temperature more than 40°C.

The reaction is continued for 1 hour at 40°C. and then 1 hour at 80°C. and then the reaction is concluded.

215 grams of condensation product [III] is obtained after dehydration of the reaction mixture.

Active organic hardener [IV] of which the end amino radical is masked partially, is made by the reaction of 100 grams of the condensation product [III] and 30 grams of meta-cresol, during 1 hour at 60°C.

EXAMPLE 4 AND COMPARATIVE EXAMPLES 5 AND 6

Epoxy resin and condensation product III, hardener IV or other hardener are mixed in the ratio (in parts by weight) illustrated on table 2, and the thus obtained compositions were cured and examined.

The results are shown in Table 2.

Table 2

|  | Example 4 | Comparative example 5 | Comparative example 6 |
|---|---|---|---|
| Epoxy resin 1 | 90 | 90 | 90 |
| Epoxy resin 3[1] | 10 | 10 | 10 |
| Condensation product III |  | 35 |  |
| Hardener IV | 45 |  |  |
| Polyamide (340 of amine value) |  |  | 50 |
| Phenol |  |  | 5 |
| Gell time (in hours) at 0°C. | 8–10 | 13–15 | not gelling after 2 days |
| Appearance of cured epoxy composition[2] | perfectly cured (18 of value of hardness test by Sward Rocker, but glass having 50 of hardness value) | almost cured | not preferably cured, having tackiness |
| Cissing[3] | A | C | B |
| Blooming[3] | A | C | B |
| Sweating[3] | A | C | B |
| Amine-blush[3] | A | C° | B |
| Others | smooth surface | cratering surface | tacky surface |
| Adhesive tensile shearing strength of mild steel boards (in Kg/cm$^2$)[4] | 82 | 41 | 3 |

Notes:
[1]Epoxy resin 3: phenoxyglycidylether having an epoxy equivalence of 300–330.
[2]Films after 2 days from curing at 0–5°C. in a refregerator.
[3]A: not found, B: found, C: much found
[4]Adhesive tensile shearing strength of mild steel boards, dipped in chilled water (0–5°C.) for 27 days.

EXAMPLES 5 AND 6 AND COMPARATIVE EXAMPLE 7

Preparation of condensation product [V], hardener [VI] and hardener [VII]

4 moles of meta-xylylenediamine and 2 moles meta-cresol are mixed at room temperature in a three-necked 1l flask, equipped with agitator, thermometer and dropping funnel.

Meta-cresol is dissolved in meta-xylylenediamine by heating the mixture at 40°–50°C. 324.4 grams (4 moles) of 37 percent (w/w) formalin is added dropwise to this mixture slowly enough not to raise the temperature more than 40°C.

The reaction is continued for 1 hour at 40°C. and then 1 hour at 80°C. and then the reaction is concluded.

804 grams of condensation product [V] is obtained after dehydration of the reaction mixture.

Active organic hardener [VI] is made by the reaction of 404 grams of the condensation product [V] and 54 grams of meta-cresol.

Active organic hardener [VII] is made by the reaction of 404 grams of the condensation product [V] and 108 grams of meta-cresol.

EXAMPLES 7 AND 8 AND COMPARATIVE EXAMPLES 8 TO 10

Epoxy resin and condensation product [V], hardener [VI], hardener [VII] or other hardener are mixed in the ratio (in parts by weight) illustrated on table 3, and thus obtained compositions were cured and examined. The results are shown in Table 3.

necked 1l flask, equipped with agitator, thermometer and dropping funnel.

2,2-bis-(4-hydroxy phenyl)propane is dissolved in meta-xylylenediamine and ethylenediamine by heating the mixture at 40°–50°C.

81.1 grams (1 moles) of 37 percent (w/w) formalin is added dropwise to this mixture slowly enough not to raise the temperature more than 40°C.

The reaction is continued for 1 hour at 40°C. and then 1 hour at 70°C. and then the reaction is concluded.

Since the condensation product [VIII] obtained by dehydration has a high viscosity, 20 grams of tetrahydrofurfurylalcohol is added to it.

And then active organic hardener [IX] is obtained by the reaction of condensation product [VIII] and 1 mole of nonylphenol for 1 hour at 70°C.

EXAMPLE 10 AND COMPARATIVE EXAMPLES 12 AND 13

Epoxy resin and condensation product [VIII], hardener [IX] or other hardener are mixed in the ratio in parts by weight illustrated on table 4, and the thus obtained compositions were cured and examined.

Table 3

|  | Example | | Comparative example | | |
|---|---|---|---|---|---|
|  | 7 | 8 | 8 | 9 | 10 |
| Epoxy resin 1 | 90 | 90 | 90 | 90 | 90 |
| Epoxy resin 3 | 10 | 10 | 10 | 10 | 10 |
| Condensation product [V] |  |  | 35 |  |  |
| Hardener [VI] | 40 |  |  |  |  |
| Hardener [VII] |  | 45 |  |  |  |
| Meta-xylylene diamine |  |  |  | 20 | 20 |
| Phenol |  |  |  |  | 5 |
| Gelling time at 0°C. (in hour)[1] | 8–11 | 6–9 | 15–17 | not gelling after 2 days | not gelling after 2 days |
| Appearance of film[2] | similar to regular cured film | similar to regular cured film | found cratering and un- uniform | not cured | unperfectly cured and very tacky, unpreferable for use |
| Specular Gloss[3] | A | A | A | C | C |
| Sweating[4] | A | A | B | C | B |
| Amine-blush[4] | A | A | B | C | C |
| Adhesion to mortar | good | good | good | bad | bad |
| Others | smooth surface | smooth and flexible surface | found cratering and fragile | found whiting | found whiting |
| Judgement[5] | ◯ | ◯ | △ | X | X |
| Adhesive bonding strength of wet mortar[6] (in Kg/cm²) | 37[7] | 33[7] | 20 | 2 | 6 |

Notes:
[1]The weight of epoxy resin composition is 50 grams.
[2]Appearance of films coated and cured on wet mortar at room temperature.
[3]A: much found, B: a little found, C: not found
[4]A: not found, B: a little found, C: much found
[5]◯ = be preferable practically
△ = be able to use practically
X = be unsuitable practically
[6]Adhesive bonding strength of wet mortar (pH 12.8) exposed in air for 20 days after curing.
[7]Broken on the mortar-bonding agent boundary surface.

EXAMPLE 9 AND COMPARATIVE EXAMPLE 11

Preparation of condensation product [VIII] and hardener [IX]

1 mole of 2,2-bis-(4-hydroxyphenyl)propane, 2 moles of meta-xylylenediamine and 1 mole of ethylenediamine are mixed at room temperature in a three- The results are shown in Table 4.

Table 4

|  | Example | Comparative example | |
|---|---|---|---|
|  | 10 | 12 | 13 |
| Epoxy resin 4[1] | 100 | 100 | 100 |
| Condensation product [VIII] |  | 35 |  |
| Hardener [IX] | 45 |  |  |
| Polyamide (amine value 380) |  |  | 60 |
| Adhesive tensile shearing |  |  |  |

Table 4-continued

|  | Example 10 | Comparative example 12 | Comparative example 13 |
|---|---|---|---|
| strength of mild steel board 1[2] (Kg/cm$^2$) | 101 | 82 | 10 |
| Adhesive tensile shearing strength of mild steel board 2[2] (Kg/cm$^2$) | | 82 | 58 |

Notes:
[1]Epoxy resin 4: diglycidyl ether of 2,2'-bis(4-hydroxy phenyl) propane having an epoxy equivalent of about 182–194 and viscosity of 110–150 poise (25°C.)
[2]Adhesive tensile shearing strength of mild steel boards adhered by the compositions cured for 7 days at 0–5°C.
[3]Adhesive tensile shearing strength of mild steel boards adhered by the compositions cured for 7 days in water at 20°C.

EXAMPLE 11

Preparation of hardener [X]

1 mole of meta-cresol, 2 moles of meta-xylylene diamine are mixed at room temperature in a three-necked 1l flask, equipped with agitator, thermometer and dropping funnel.

Meta-cresol is dissolved in meta-xylylenediamine by heating the mixture at 40°–50°C. 162.2 grams (2 moles) of 37 percent (w/w) formalin is added dropwise to this mixture slowly enough not to raise the temperature more than 40°C.

The reaction is continued for 1 hour at 40°C. and then 1 hour at 80°C. and then the reaction is concluded.

804 grams of the condensation product is obtained by distillation under reduced pressure.

Active organic hardener [X] is made by the reaction of condensation product and meta-cresol in the ratio of 1:2 (mole:mole).

COMPARATIVE EXAMPLE 14

Preparation of condensation product [XI]

3 moles of meta-cresol, 2 moles of meta-xylylene diamine are mixed at room temperature in a three-necked 1l flask, equipped with agitator, thermometer and dropping funnel.

Meta-cresol is dissolved in meta-xylylenediamine by heating the mixture at 40°–50°C.

162.2 grams (2 moles) of 37 percent (w/w) formalin is added dropwise to this mixture slowly enough not to raise the temperature more than 40°C.

The reaction is continued for 1 hour at 40°C. and then 1 hour at 80°C. and then the reaction is concluded.

Condensation product [XI] is obtained after dehydration of the reaction mixture.

EXAMPLE 12

Epoxy resin 4 and hardener [X] are mixed in the ratio of 100:55 (weight : weight) and obtained composition is cured at room-temperature or 0°–5°C.

Films obtained by curing the composition at room-temperature for 24 hours are quite glossy, and no sweating, no amine-blush and no cissing are found.

Adhesive tensile shearing strength of mild steel board adhered by the composition cured at 0°–5°C. for 7 days is 123.6 Kg/cm$^2$.

COMPARATIVE EXAMPLE 15

Example 12 is repeated, except 36 parts of condensation product [V] plus 19 parts of meta-cresol are used instead of 55 parts of hardener [X].

Thus the mole ratio of meta-cresol (phenols (a)), meta-xylylene diamine (polyamines (b)), formaldehyde (carbonyl compounds (c)) and meta-cresol (phenols (d)) is the same as in Example 12, but meta-cresol (phenols (d)) is not reacted with condensation product [V].

Films obtained by curing the compositions at room-temperature for 24 hours are not glossy, and sweating, amine-blush and cissing are found a little.

Adhesive tensile shearing strength of mild steel boards adhered by the composition cured at 0°–5°C. for 7 days is 98.6 Kg/cm$^2$.

EXAMPLE 13

Example 12 is repeated, except 46 parts of hardener [VII] is used instead of 55 parts of hardener [X]. Thus the mole ratio of meta-cresol (phenols (a)), meta-xylylene diamine (polyamines (b)) and formaldehyde (carbonyl compounds (c)) is the same as in Example 12, but the mole ratio of condensation product [V] and meta-cresol (phenols (d)) is different.

Films obtained by curing the compositions at room-temperature for 24 hours are quite glossy, and no sweating, no amine-blush and no cissing are found.

Adhesive tensile shearing strength of mild steel boards adhered by the composition cured at 0°–5°C. for 7 days is 91.8 Kg/cm$^2$.

COMPARATIVE EXAMPLE 16

Example 12 is repeated, except 36 parts of condensation product [V] plus 10 parts of meta-cresol are used instead of 55 parts of hardener [X].

Thus the mole ratio of meta-cresol (phenols (a)), meta-xylylene diamine (polyamines (b)), formaldehyde (carbonyl compounds (c)) and meta-cresol (phenols (d)) is the same as in Example 13, but meta-cresol (phenols (d)) is not reacted with condensation product [V].

Films obtained by curing the compositions at room temperature for 24 hours are not glossy, and sweating, amine-blush and cissing are found a little.

Adhesive tensile shearing strength of mild steel boards adhered by the composition cured at 0°–5°C. for 7 days is 88.4 Kg/cm$^2$.

EXAMPLE 14

Example 12 is repeated, except 41 parts of hardener [VI] is used instead of 55 parts of hardener [X]. Thus the mole ratio of meta-cresol (phenols (a)), meta-xylylene diamine (polyamines (b)) and formaldehyde (carbonyl compounds (c)) is the same as in Example 12, but the mole ratio of condensation product [V] and meta-cresol (phenols (d)) is different.

Films obtained by curing the compositions at room temperature for 24 hours are quite glossy, and no sweating is found. But amine-blush and cissing are a little found.

Adhesive tensile shearing strength of mild steel boards adhered by the composition cured at 0°–5°C. for 7 days is 86.8 Kg/cm$^2$.

COMPARATIVE EXAMPLE 17

Example 12 is repeated, except 38 parts of condensation product [XI] is used instead of 55 parts of hardener [X]. Thus the mole ratio of metacresol (phenols (a)), meta-xylylene diamine (polyamines (b)), formaldehyde (carbonyl compounds (c)) and meta-cresol (phenols (d)) is the same as in Example 12, but all reactants are reacted at one time.

Films obtained by curing the composition at room temperature for 24 hours are glossy, and no sweating, no amine-blush and no cissing are found.

Adhesive tensile shearing strength of mild steel boards adhered by the composition cured at 0° – 5°C. for 7 days is 49.6 Kg/cm$^2$.

EXAMPLES 15 TO 17 AND COMPARATIVE EXAMPLE 18

Preparation of Hardeners [XIII] - [XV] and condensation Product [XII]

3 moles of triethylene tetramine, 1 mole of meta-cresol are mixed at room temperature in a three-necked 1l flask, equipped with agitator, thermometer and dropping funnel.

Meta-cresol is dissolved in triethylene tetramine by heating the mixture at 40°–50°C.

243.3 grams (3 moles) of 37 percent (w/w) formalin is added dropwise to this mixture slowly enough not to raise the temperature more than 40°C.

The reaction is continued for 1 hour at 40°C. and then 1 hour at 80°C. and then the reaction is concluded.

Condensation product [XII] is obtained after dehydration of the reaction mixture.

Active organic hardener [XIII] is made by the reaction of condensation product [XII] and nonyl phenyl in the ratio of 1 : 0.5 (mole : mole).

Active organic hardener [XIV] is made by the reaction of condensation product [XII] and nonyl phenol in the ratio of 1:2 (mole:mole).

Active organic hardener [XV] is made by the reaction of condensation product [XII] and nonyl phenol in the ratio of 1 : 3 (mole : mole).

COMPARATIVE EXAMPLE 19

Preparation of condensation product [XVI]

1 mole of meta-cresol, 2 moles of nonyl phenol, 3 moles of triethylene tetramine are mixed at room temperature in a three-necked 1l flask, equipped with agitator, thermometer and dropping funnel.

Meta-cresol and nonyl phenol is dissolved in triethylene tetramine by heating the mixture at 40°–50°C.

243.3 grams (3 moles) of 37 percent (w/w) formalin is added dropwise to this mixture slowly enough not to raise the temperature more than 40°C.

The reaction is continued for 1 hour at 40°C. and then 1 hour at 80°C. and then the reaction is concluded.

Condensation product [XVI] is obtained after dehydration of the reaction mixture.

EXAMPLE 18

Epoxy resin 4 and hardener [XIV] are mixed in the ratio of 100 : 20.6 (weight : weight) and the obtained composition is cured at room temperature for 24 hours to produce a film.

This film is glossy, and no sweating and no cissing are found. But amine-blush is found a little.

Adhesive tensile shearing strength of mild steel boards adhered by the composition cured at 0°– 5°C. for 7 days is 89.2 Kg/cm$^2$.

COMPARATIVE EXAMPLE 20

Example 18 is repeated, except 11.7 parts of condensation product [XII] plus 8.9 parts of nonylphenol are used instead of 20.6 parts of hardener [XIV]. Thus the mole ratio of meta-cresol (phenols (a)), triethylene tetramine (polyamines (b)), formaldehyde (carbonyl compounds (c)) and nonyl phenol (phenols (d)) is the same as in Example 18, but nonyl phenol (phenols (d)) is not reacted with condensation product [XII].

Films obtained by curing the composition at room temperature for 24 hours are not glossy at all, and sweating and cissing are found a little, And amine-blush is remarkably found.

Adhesive tensile shearing strength of mild steel boards adhered by the composition cured at 0°– 5°C. for 7 days is 44.1 Kg/cm$^2$.

EXAMPLE 19

Example 18 is repeated, except 14 parts of hardener [XIII] is used instead of 20.6 parts of hardener [XIV].

Thus the mole ratio of meta-cresol(phenols (a)), triethylene tetramine (polyamines (b)) and formaldehyde (carbonyl compounds (c)) is the same as in Example 18, but the mole ratio of condensation product [XII] and nonyl phenol (phenols (d)) is different.

Films obtained by curing the composition at room temperature for hours are glossy, and no amine-blush and no cissing are found.

But sweating is found a little.

Adhesive tensile shearing strength of mild steel boards adhered by the composition cured at 0°–5°C. for 7 days is 87.8 Kg/cm$^2$.

EXAMPLE 20

Example 18 is repeated, except 25 parts of hardener [XV] is used instead of 20.6 parts of hardener [XIV].

Thus, the mole ratio of meta-cresol (phenols (a)), triethylene tetramine (polyamines (b)) and formaldehyde (carbonyl compounds (c)) is the same as in Example 18, but the mole ratio of the condensation product [XII] and nonyl phenol (phenols (d)) is different.

Films obtained by curing the composition at room temperature for 24 hours are glossy, and no cissing and no sweating is found. But amine blush is found a little.

Adhesive tensile shearing strength of mild steel boards adhered by the composition cured at 0°– 5°C. for 7 days is 83.8 Kg/cm$^2$.

COMPARATIVE EXAMPLE 21

Example 18 is repeated, except that 21 parts of condensation product [XVI] is used instead of 20.6 parts of hardener [XIV].

Thus the mole ratio of meta-cresol (phenols (a)), triethylene tetramine (polyamines (b)), formaldehyde (carbonyl compounds (c)) and meta-cresol (phenols (d)) is the same as in Example 18, but all reactants are reacted at one time.

Films obtained by curing the composition at room temperature for 24 hours are not glossy at all, sweating is found, and amine-blush and cissing are remarkably found.

Adhesive tensile shearing strength of mild steel boards adhered by the composition cured at 0°–5°C. for 7 days is 39.2 Kg/cm$^2$.

EXAMPLE 21 AND COMPARATIVE EXAMPLE 22

Preparation of hardener [XVIII] and condensation product [XVII]

1 mole of meta-cresol and 3 moles of ethylenediamine are mixed at room temperature in a three-necked 1$l$ flask, equipped with agitator, thermometer and dropping funnel.

Meta-cresol is dissolved in ethyenediamine by heating the mixture at 40°–50°C.

243.3 grams (3 moles) of 37 percent (w/w/) formalin is added dropwise to this mixture slowly enough not to raise the temperature more than 40°C.

The reaction is continued for 1 hour at 40°C. and then 1 hour at 80°C. and then the reaction is concluded.

Condensation product [XVII] is obtained after dehydration of the reaction mixture.

Active organic hardener [XVIII] is made by the reaction of condensation product [XVII] and nonyl phenol in the mole ratio of 1 : 2.

EXAMPLE 22

Epoxy resin 4 and hardener [XVIII] are mixed in the ratio 100 : 73.5 (weight : weight) and the obtained composition is cured at room temperature.

Films obtained by curing the composition at room temperature for 24 hours are glossy, and no sweating, no amine-blush and no cissing are found.

COMPARATIVE EXAMPLE 23

Example 22 is repeated, except that 25 parts of condensation product [XVII] plus 48.5 parts of nonyl phenol and 5 parts of methyl iso-butyl ketone is used instead of 73.5 parts of hardener [XVIII]. Since viscosity of condensation product [XVII] is so high as difficult to mix with Epoxy resin 4, methyl iso-butyl ketone is used as diluent.

Thus the mole ratio of meta-cresol (phenols (a)), ethylene diamine (polyamines (b)), formaldehyde (carbonyl compounds (c)) and nonyl phenol (phenols (d)) is the same as in the Example 22, but meta-cresol (phenols (d)) is not reacted with the condensation product [XVII].

Films obtained by curing the composition at room temperature for 24 hours are glossy, and no sweating, no amine-blush and no cissing are found, but cratering is remarkably found.

EXAMPLE 23

Preparation of hardener [XIX]

Example 11 is repeated but paraformaldehyde is used in formaldehyde equivalent instead of 2 moles of formaldehyde.

EXAMPLE 24

Example 12 is repeated but hardener [XIX] is used instead of hardener [X].

A well-cured resin is obtained, and the results of examination are similar to the results in Example 11.

What we claim is:

1. A hardenable epoxy resin composition which contains as essential constituents
    A. at least one epoxy compound having on the average more than one adjacent epoxy group per molecule and selected from the group consisting of polyglycidyl ethers of polyhydric phenols containing one or more aromatic nuclei, polyglycidyl ethers of alcoholic polyhydroxyl compounds obtained by the addition reaction of polyhydric phenols containing one or more aromatic nuclei with alkylene oxides containing 2 to 4 carbon atoms, and polyglycidyl ethers of alcoholic polyhydroxyl compounds containing one or more alicyclic rings and
    B. 15 to 35 percent by weight, based on the weight of the epoxy compound (A), of at least one hardener produced by coupling
    1. a polyamino condensation product produced by condensing essentially
        1-1. phenol (a) having at least one reactive hydrogen atom attached to an aromatic nucleus and selected from the group consisting of phenol, cresol and 2,2-bis(4-hydroxyphenyl)-propane, with
        1-2. diamine (b) having at least one active hydrogen atom attached to an amino nitrogen atom per molecule and selected from the group consisting of ethylenediamine, hexamethylenediamine, triethylene tetramine and xylylenediamine, and with
        1-3. member (c) selected from the group consisting of formaldehyde and its functional derivatives, in the mole ratio of (a) : (b) : (c) of 1 : 1–3 : 1—3, the condensation reaction mixture being at a temperature lower than 40°C when the member (c) is added, and then the temperature is raised above 40°C to effect a condensation reaction, and
    2. alkylphenol (d) selected from the group consisting of cresol and nonylphenol, the ratio of equivalents of phenolic hydroxy groups of alkylphenol (d) : equivalents of active hydrogen atom attached to amino nitrogen atoms of the polyamino condensation product being 0.1 – 1.0 : 1, the coupling reaction being carried out at a temperature of 10°–150°C.

* * * * *